(12) United States Patent
Wagle et al.

(10) Patent No.: US 9,284,479 B2
(45) Date of Patent: Mar. 15, 2016

(54) INVERT EMULSION FOR SWELLING ELASTOMER AND FILTERCAKE REMOVAL IN A WELL

(71) Applicant: Halliburton Energy Services, Inc., Houston, TX (US)

(72) Inventors: Vikrant Bhavanishankar Wagle, Mumbai (IN); Kushabhau Dagadu Teke, Pune (IN); Dhanashree Gajanan Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 13/924,534

(22) Filed: Jun. 22, 2013

(65) Prior Publication Data

US 2014/0374099 A1    Dec. 25, 2014

(51) Int. Cl.
E21B 43/12 (2006.01)
E21B 43/22 (2006.01)
C09K 8/52 (2006.01)
C09K 8/64 (2006.01)

(52) U.S. Cl.
CPC ... C09K 8/52 (2013.01); C09K 8/64 (2013.01); E21B 43/12 (2013.01); C09K 2208/26 (2013.01)

(58) Field of Classification Search
CPC ...... C09K 8/265; C09K 8/36; C09K 2208/14; E21B 43/12; E21B 21/003; E21B 33/1208
See application file for complete search history.

(56) References Cited

U.S. PATENT DOCUMENTS

| | | | |
|---|---|---|---|
| 5,888,944 A | 3/1999 | Patel | |
| 5,909,774 A | 6/1999 | Griffith et al. | |
| 6,631,764 B2 | 10/2003 | Parlar et al. | |
| 7,392,845 B2 | 7/2008 | Berry et al. | |
| 7,481,273 B2 | 1/2009 | Javora et al. | |
| 7,855,168 B2 | 12/2010 | Fuller et al. | |
| 7,906,464 B2 | 3/2011 | Davidson | |
| 7,939,474 B2 | 5/2011 | Blauch et al. | |
| 8,091,645 B2 | 1/2012 | Quintero et al. | |
| 8,105,989 B2 | 1/2012 | Svoboda et al. | |
| 2004/0055747 A1 | 3/2004 | Lee | |
| 2006/0073986 A1 | 4/2006 | Jones et al. | |
| 2008/0200354 A1* | 8/2008 | Jones et al. | 507/244 |
| 2010/0190664 A1 | 7/2010 | Svoboda et al. | |
| 2010/0300967 A1 | 12/2010 | Dakin et al. | |
| 2014/0110119 A1* | 4/2014 | Luyster et al. | 166/305.1 |

OTHER PUBLICATIONS

J.T. Davies, "A Quantitative Kinetic Theory of Emulsion Type. I. Physical Chemistry of the Emulsifying Agent," Proceedings of 2nd International Congress Surface Activity, Butterworths, London, 1957, pp. 426-438.

William C. Griffin, "Classification of Surface-Active Agents by 'HLB'," Journal of the Society of Cosmetic Chemists, Chicago, Illinois, Oct. 11, 1949, pp. 311-326.

William C. Griffin, "Calculations of HLB Values of Non-Ionic Surfactants," Journal of the Society of Cosmetic Chemists, New York City, NY, May 14, 1954, pp. 249-256.

Natalie Collins, Kingsley Nzeabide, Steve Almond, "Environmentally Friendly Filtercake Removal System," AADE-11-NTCE-78, 2011 AADE National Technical Conference and Exhibition, Houston, Texas, Apr. 12-14, 2011, 10 pages.

J. Buc Slay, Thomas W. Ray, "Fluid Compatibility of Elastomers in Oilfield Completion Brines," Paper # 03140, NACE Corrosion 2003, San Diego, CA, Mar. 17-19, 2003, 12 pages.

* cited by examiner

*Primary Examiner* — Zakiya W Bates
(74) *Attorney, Agent, or Firm* — Holly Soehnge; Baker Botts L.L.P.

(57) ABSTRACT

A treatment fluid and method for simultaneously swelling an oil-swellable elastomer and breaking a filtercake in a well. The treatment fluid includes an emulsion comprising: (i) a continuous oil phase, wherein the oil phase comprises: (a) an oil; and (b) an emulsifier; and (ii) an internal aqueous phase, wherein the aqueous phase comprises: (a) water; and (b) a water-soluble hydrolyzable ester of a carboxylic acid; wherein the emulsion is stable to hydrolysis of the water-soluble hydrolyzable ester of the carboxylic acid. A method of treating a well includes the steps of: (A) forming the treatment fluid; and (B) introducing the treatment fluid into the portion of the wellbore, wherein: (i) a filtercake has been previously formed in the portion of the wellbore, wherein the filtercake comprises an acid-soluble or an acid-degradable material; and (ii) an oil-swellable elastomer has been previously deposited or positioned in the portion of the wellbore.

11 Claims, No Drawings

INVERT EMULSION FOR SWELLING ELASTOMER AND FILTERCAKE REMOVAL IN A WELL

CROSS-REFERENCE TO RELATED APPLICATIONS

Not applicable.

TECHNICAL FIELD

The inventions are in the field of producing crude oil or natural gas from subterranean formations. More specifically, the inventions generally relate to methods of completing a well.

BACKGROUND

To produce oil or gas, a well is drilled into a subterranean formation that is an oil or gas reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well.

For example, completion or intervention treatments can include, for example, sand control, including gravel packing with mechanical screens.

Drilling and Drilling Fluids

A well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. As upper portions are cased or lined, progressively smaller drilling strings and bits must be used to pass through the uphole casings or liners, which steps the borehole down to progressively smaller diameters.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to maintain hydrostatic pressure in the wellbore, lubricate the drill string, and carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid. Such factors may include but not limited to presence of water-swellable formations, need for a thin but a strong and impermeable filtercake, temperature stability, corrosion resistance, stuck pipe prevention, contamination resistance and production protection.

Completion and Completion Fluids

During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Fluid-Loss Control and Filtercake Formation

Fluid loss refers to the undesirable leakage of a fluid phase of any type of drilling, completion, or other treatment fluid into the permeable matrix of a subterranean formation. Fluids used in drilling, completion, or servicing of a wellbore can be lost to a subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor (for example less than 10 bbl/hr), which is referred to as seepage loss, to severe (for example, greater than 500 bbl/hr), which is referred to as complete loss. The greater the fluid loss, the more difficult it is to achieve the purpose of the fluid.

Fluid-loss control refers to treatments designed to reduce fluid loss. Providing effective fluid-loss control for fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. As the fluid phase carrying the fluid-loss control material leaks into the formation, the fluid-loss control material bridges the pore throats of the matrix of the formation and builds up on the surface of the borehole or fracture face or penetrates only a little into the matrix. All else being equal, the higher the concentration of the appropriately sized particulate, the faster bridging will occur. The buildup of solid particulate or other fluid-loss control material on the walls of a wellbore or a fracture is referred to as a filtercake. Such a filtercake can help block the further loss of a fluid phase (referred to as a filtrate) into the subterranean formation. A fluid-loss control material is specifically designed to lower the volume of a filtrate that passes through a filter medium. Accordingly, a fluid-loss control material is sometimes referred to as a filtration control agent.

Fluid-loss control fluids typically include an aqueous continuous phase and a high concentration of a viscosifying agent (usually crosslinked), and usually, bridging particles, such as graded sand, graded salt particulate, or graded calcium carbonate particulate. Through a combination of viscosity, solids bridging, and cake buildup on the porous rock of the borehole, such fluids are often able to substantially reduce the permeability of a zone of the subterranean formation to fluid loss.

For example, commonly used fluid-loss control pills contain high concentrations (100 to 150 lbs/1000 gal) of derivatized hydroxyethylcellulose ("HEC"). HEC is generally accepted as a viscosifying agent affording minimal permeability damage during completion operations. Normally, HEC polymer solutions do not form rigid gels, but control fluid loss by a viscosity-regulated or filtration mechanism. Some other viscosifying polymers that have been used include xanthan, guar, guar derivatives, carboxymethylhydroxyethylcellulose ("CMHEC"), and starch. Viscoelastic surfactants can also be used.

Crosslinked polymers can also be used for fluid-loss control. Crosslinking the gelling agent polymer helps suspend solids in a fluid as well as provide fluid-loss control. Further, crosslinked fluid-loss control pills have demonstrated that they require relatively limited invasion of the formation face to be fully effective. To crosslink the viscosifying polymers, a suitable crosslinking agent that includes polyvalent metal ions is used. Boron, aluminum, titanium, and zirconium are common examples.

A fluid-loss control pill is a treatment fluid that is designed or used to provide some degree of fluid-loss control. A fluid-loss control pill is usually used prior to introducing another drilling fluid or treatment fluid into zone. In addition, fluid-loss control materials are sometimes used in drilling fluids, various types of completion fluids, or various types of treatment fluids used in intervention.

Filtercake Degradation

After a filtercake is formed, which can occur during drilling or various completion operations, it is usually desirable to restore the permeability of a producing zone for production from the zone. If the formation permeability of the desired producing zone is not restored, production levels from the formation can be significantly lower. Any filtercake or any solid or polymer filtration into the matrix of the zone resulting from a fluid-loss control treatment must be degraded to restore the formation's permeability, preferably to at least its original level. This is often referred to as clean up. In many cases, the filtercake adheres strongly to the borehole penetrating the formation, which makes clean up a difficult process.

Chemicals used to help degrade or remove a filtercake are called breakers.

Breakers for helping to degrade or remove a filtercake must be selected to meet the needs of each situation. First, it is important to understand the general performance criteria for degrading or breaking of a filtercake. Premature degradation of a filtercake can cause undesired fluid loss into a formation. Inadequate degradation of a filtercake can result in permanent damage to formation permeability. A breaker for degrading or removing a filtercake should be selected based on its performance in the temperature, pH, time, and desired filtercake profile for each specific fluid-loss application.

The term "degrade," as used herein, refers to at least a partial degradation of a material in the filtercake. No particular mechanism is necessarily implied by degrading or breaking regarding a filtercake. A filtercake can be degraded or removed, for example, by dissolving the bridging particulate, chemically degrading or hydrolyzing a viscosity-increasing agent in the filtercake, reversing or degrading crosslinking if the viscosity-increasing agent is crosslinked, or any combination of these. More particularly, for example, a fluid-loss control agent can be selected for being insoluble in water but soluble in acid, whereby changing the pH or washing with an acidic fluid can dissolve a fluid-loss control agent or hydrolyze a viscosity-increasing agent in the filtercake.

Chemical breakers used to help clean up a filtercake or break the viscosity of a viscosified fluid are generally grouped into several classes: oxidizers, enzymes, chelating agents, and acids.

A filtercake usually includes sized calcium carbonate or other acid-soluble particulate and an acid-degradable polymeric material.

Oil-Swellable Elastomer

Oil-swellable elastomers have various applications in wells, especially wells used for producing hydrocarbons. For example, an oil-swellable elastomer can be used in downhole tools having swellable components, such as swellable packers. For another example, oil-swellable elastomers can be used as particulate in various hydraulic fracturing operations as part of a proppant matrix. In yet another example, an oil-swellable particulate can be used as a particulate in a gravel pack.

An oil-swellable elastomer swells when exposed to a fluid comprising a hydrocarbon. The elastomer swells as a hydrocarbon enters and is trapped in the elastomer matrix due to the natural affinity of the polymer molecules of the elastomer and the hydrocarbon. Oil is absorbed into the oil-swellable elastomer through diffusion. Through the random thermal motion of the atoms that are in the liquid hydrocarbons, oil diffuses into the elastomer. As hydrocarbon molecules are absorbed into the polymer matrix of the elastomer, it causes the elastomer to stretch and expand. Swelling of the elastomer in the presence of oil is irreversible (whereas water-swelling elastomer, which operates on osmosis phenomenon, is reversible process). The swelling continues until the internal stresses inside the elastomer reach equilibrium. That is, the swell pressure increases until diffusion can no longer occur.

Although the hydrocarbon of the fluids used for this purpose should not degrade the elastomer, they will alter its mechanical properties, such as hardness and tensile strength, depending on the volume increase.

An example of an application of oil-swellable elastomers is in oil-swellable downhole tools such as swell screens used for sand control.

Sand control is an operation to reduce production of formation sand or other fines from a poorly consolidated subterranean formation. In this context, "fines" are tiny particles, typically having a diameter of 43 microns or smaller, that have a tendency to flow through the formation with the production of hydrocarbon fluids. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the sand and fines are highly abrasive and can be damaging to pumping and other oilfield equipment and operations.

Placing a relatively larger particulate near the wellbore can help filter out the sand or fine particles and prevents them from flowing into the well with the produced fluids. The primary objective is to stabilize the formation while causing minimal impairment to well productivity. The particulate used for this purpose is referred to as "gravel." In the oil and gas field, and as used herein, the term "gravel" is refers to relatively large particles ranging in diameter from about 0.1 mm up to about 2 mm. Generally, a particulate having the properties, including chemical stability, of a low-strength proppant is used in gravel packing. An example of a commonly used gravel packing material is sand having an appropriately large particulate size range.

In general, a mechanical screen is placed in the wellbore and the surrounding annulus is packed with a particulate of a larger specific size designed to prevent the passage of formation sand or other fines.

An example of such a mechanical swell screen is PETROGUARD™ Swell screens, which are commercially available from Halliburton Energy Services. PETROGUARD™ swell screens provide an alternative to traditional expandable sand-control techniques. The design combines Halliburton's SWELL TECHNOLOGY™ systems with bonded mesh filtration media provide a self-expanding screen that delivers the benefits associated with traditional expandable solutions, but with greatly reduced risk. The PETROGUARD™ swell screens utilize a base pipe with a sheath of an oil-swellable elastomer.

When the elastomer is formed into the form of a sheath around a piece of pipe or other tubular, the result of the swelling is an increase of the outside diameter of the oil-swellable elastomer on the tubular. The oil-swellable elastomer is developed by contact with oil in order to swell and seal between casing strings or pipe and open hole. Swelling of the packer is consistent along its length. Oil continues to diffuse into the elastomer causing the packing element to swell until it reaches the inside diameter of the open borehole. At this point a differentially sealing annular barrier can be created.

Operationally, the benefit of a swellable packer is simplicity. There are no moving parts required to work, through pipe manipulation or by applied hydraulic pressure. No special service personnel are needed. The packers are simply run to depth, similar to a casing, and allowed to swell before production or injection operations begin.

SUMMARY OF THE INVENTION

A clean well bore is one of the most critical aspects of the productive, trouble free completion. More importantly, a clean wellbore ultimately leads to enhanced production through reducing or eliminating fine solids that are potentially damaging to the formation.

A typical well completion would include the following steps. First, removal of a filtercake to improve well productivity by reducing damage to the production zone. For example, a delayed-release acid system can be engineered to uniformly remove filtercake across an entire producing interval by slowly releasing weak acids to dissolve materials in the filtercake. Second, swelling of a swellable elastomer in the well that is capable of swelling in water or in oil to isolate a particular reservoir section of the production zone. However, such a process is a two-step process, wherein the filtercake is first removed by a water-based acid system followed by another step that includes the use of an oil to swell an oil-swellable elastomer, such as used in Halliburton's PETROGUARD™ swell screens for sand control. The multiple fluid treatments increase the time and operational cost of a completion.

A purpose of this invention is to disclose a dual functional treatment fluid and method for simultaneously swelling of an oil-swellable elastomer and breaking or removing a filtercake in a well. An oil-swellable elastomer is commonly used, for example, for expanding a sand-control swell screen in a well. A filtercake is commonly deposited or formed by a drilling fluid during a drill-in operation in a well.

In general, the dual functional breaker system is a water-in-oil type of emulsion wherein the internal phase of the emulsion comprises of a hydrolyzable ester of carboxylic acid and water. The internal phase preferably additionally includes a water-soluble salt. The external continuous phase comprises of an oil and emulsifier. The emulsifier is chosen such as to provide a water-in-oil emulsion, which preferably does not break during the hydrolysis of the carboxylic ester.

According to an embodiment of the invention, an emulsion for treating a portion of a wellbore of a well is provided, the emulsion comprising: (i) a continuous oil phase, wherein the oil phase comprises: (a) an oil; and (b) an emulsifier; and (ii) an internal aqueous phase, wherein the aqueous phase comprises: (a) water; and (b) a water-soluble hydrolyzable ester of a carboxylic acid; wherein the emulsion is stable to hydrolysis of the water-soluble hydrolyzable ester of the carboxylic acid.

According to another embodiment of the invention, a method of treating a portion of a wellbore is provided, the method comprising the steps of: (A) forming the treatment fluid; and (B) introducing the treatment fluid into the portion of the wellbore, wherein: (i) a filtercake has been previously formed in the portion of the wellbore, wherein the filtercake comprises an acid-soluble or an acid-degradable material; and (ii) an oil-swellable elastomer has been previously deposited or positioned in the portion of the wellbore.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

Oil and gas are composed of one or more hydrocarbons. A hydrocarbon is a compound having at least hydrogen and carbon. The molecular structure of hydrocarbon compounds can range from being as simple as methane ($CH_4$) to a large, highly complex compound. Petroleum is a complex mixture of hydrocarbons.

A "subterranean formation" is a body of rock that has sufficiently distinctive characteristics and is sufficiently continuous for geologists to describe, map, and name it. In the context of formation evaluation, a subterranean formation refers to the volume of rock seen by a measurement made through a wellbore, as in a log or a well test. These measurements indicate the physical properties of this volume of rock, such as the property of permeability.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or treatment fluids can be directed from the wellhead into any desired portion of the wellbore.

As used herein, the word "tubular" means any kind of structural body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location. Tubulars can be of any suitable body material, but in the oilfield they are most commonly of steel.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "treatment fluid" broadly refers to any fluid adapted to be introduced into a well for any purpose. A treatment fluid can be, for example, a drilling fluid, a setting composition, a treatment fluid, or a spacer fluid. If a treatment fluid is to be used in a relatively small volume, for example less than about 200 barrels (about 8,400 US gallons or about 32 $m^3$), it is sometimes referred to as a wash, dump, slug, or pill.

The barrel is the unit of measure used in the U.S. oil industry, wherein one barrel equals 42 U.S. gallons. Standards bodies such as the American Petroleum Institute (API) have adopted the convention that if oil is measured in oil barrels, it will be at 14.696 psi and 60° F., whereas if it is measured in cubic meters, it will be at 101.325 kPa and 15° C. (or in some cases 20° C.). The pressures are the same but the temperatures are different—60° F. is 15.56° C., 15° C. is 59° F., and 20° C. is 68° F. However, if all that is needed is to convert a volume in barrels to a volume in cubic meters without compensating for temperature differences, then 1 bbl equals 0.159 $m^3$ or 42 U.S. gallons.

In the context of a well or wellbore, a "portion" or "interval" refers to any downhole portion or interval of the length of a wellbore.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the treatment fluid on the BHST during treatment. The design temperature for a treatment fluid is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

Substances, Chemicals, and Polymers

A substance can be a pure chemical or a mixture of two or more different chemicals.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

As used herein, a "polymer" or "polymeric material" includes polymers, copolymers, terpolymers, etc. In addition, the term "copolymer" as used herein is not limited to the combination of polymers having only two monomeric units, but includes any combination of monomeric units, for example, terpolymers, tetrapolymers, etc.

Fluids

A fluid can be a single phase or a dispersion. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a treatment fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

In the context of a treatment fluid, oil is understood to refer to an oil liquid, whereas gas is understood to refer to a physical state of a substance, in contrast to a liquid. In this context, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (that is, shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most treatment fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

Unless otherwise specified, the apparent viscosity of a fluid (excluding any suspended solid particulate larger than silt) is measured with a FANN™ Model 35 type viscometer with a bob and cup geometry using an R1 rotor, B1 bob, and F1 torsion spring at a shear rate of 511 sec$^{-1}$ (300 rpm) and at a temperature of 77° F. (25° C.) and a pressure of 1 atmosphere.

A substance is considered to be a fluid if it has an apparent viscosity less than 5,000 mPa·s (5,000 cP) (independent of any gel characteristic). For reference, the viscosity of pure water is about 1 mPa·s (1 cP).

General Approach

After a filtercake is formed, it may be desirable to restore permeability into the formation. If the formation permeability of a producing zone is not restored, production levels from the formation can be significantly lower. A filtercake or a solid or polymer filtration into the matrix of the zone resulting from a fluid-loss control treatment must be degraded or removed to restore the formation's permeability, preferably to at least its original level. This is often referred to as "clean up."

Although various types of acidic breaker fluids are commonly used for filtercake clean up, it is often desirable to allow for a delay in acid generation to give sufficient time for the treatment fluid to be placed across a treatment interval. After placing the treatment fluid, the well is shut in for a sufficient time to initiate degrading of the filtercake and to enable efficient and complete clean up.

In addition, an oil-swellable elastomer can be deposited or positioned in the well, for example, as part of an oil-swellable tool. Such elastomers can be expanded by contacting with an oil.

A purpose of this invention is to disclose a dual functional treatment fluid and method for simultaneously swelling of an oil-swellable elastomer and breaking or removing a filtercake in a well. An oil-swellable elastomer is commonly used, for example, for expanding a sand-control swell screen in a well. A filtercake is commonly deposited or formed by a drilling fluid during a drill-in operation in a well.

In general, the dual functional breaker system is a water-in-oil type of emulsion wherein the internal phase of the emulsion comprises of a hydrolyzable ester of carboxylic acid and water. The internal phase preferably additionally includes a water-soluble salt. The external continuous phase comprises of an oil and emulsifier. The emulsifier is chosen such as to provide a water-in-oil emulsion, which preferably does not break during the hydrolysis of the carboxylic ester.

According to an embodiment of the invention, an emulsion for treating a portion of a wellbore of a well is provided, the emulsion comprising: (i) a continuous oil phase, wherein the oil phase comprises: (a) an oil; and (b) an emulsifier; and (ii) an internal aqueous phase, wherein the aqueous phase comprises: (a) water; and (b) a water-soluble hydrolyzable ester of a carboxylic acid; wherein the emulsion is stable to hydrolysis of the water-soluble hydrolyzable ester of the carboxylic acid.

According to another embodiment of the invention, a method of treating a portion of a wellbore is provided, the method comprising the steps of: (A) forming the treatment fluid; and (B) introducing the treatment fluid into the portion of the wellbore, wherein: (i) a filtercake has been previously formed in the portion of the wellbore, wherein the filtercake comprises an acid-soluble or an acid-degradable material; and (ii) an oil-swellable elastomer has been previously deposited or positioned in the portion of the wellbore.

The present invention provides a single treatment fluid that can simultaneously remove a filtercake residue and swell an oil-swellable elastomer in the wellbore. The use of a single breaker system would avoid the use of a two-step process thereby saving a lot of time and operational cost of completion.

Another benefit of using an emulsion as a swelling medium would be the ability to design a fluid with a desired specific gravity that is higher than for an oil, which is not possible while using only oil as a swelling medium for the elastomers.

The present invention provides a hydrolyzable ester based invert emulsion as a treatment fluid that is able to remove the residual oil-based filtercake residues having an acid-soluble or degradable material that has been deposited during a drilling operation and simultaneously serving as a swelling agent for oil-swellable elastomers without affecting the emulsion stability. The breaking time of the filtercake can be controlled by varying the concentration of hydrolyzable ester in the internal aqueous phase of the treatment fluid. In addition, the emulsion form of the delayed-acid provides an additional mechanism for controlling the delay time of filtercake breaking.

An example of an application of the invention is for swelling of an oil-swellable elastomer used in oil-swellable downhole tools such as swell screens and simultaneous cleanup of a filtercake in the portion of the wellbore.

Oil-Swellable Elastomers

In broadest terms, there are essentially two main types of swellable elastomers used for downhole packers: oil-swellable or water-swellable.

Oil swellable elastomers work on the principle of absorption and diffusions. The swelling rate and volume increases are directly related to the composition and characteristics of the oil. The amount of swelling is dependent on the chemistry of the elastomer, the chemistry of the oil, and the temperature and pressure at which the exposure occurs, among other things. For example, the specific gravity of the oil, the viscosity of the treatment fluid, and contact temperature are important variables in determining the time required for the oil-swellable elastomer to swell.

In contrast, water-swelling elastomers work on the principle of osmosis, a process that encourages the movement of water particles across a semi-permeable membrane, where there is a salinity difference on either side of the membrane.

The swelling characteristics of an oil-swellable elastomer is preferably matched to the specific well conditions.

Preferably, an oil-swellable elastomer used in an embodiment of the present invention can swell by at least 100% of its original volume when contacted by oil. As those of ordinary skill in the art, with the benefit of this disclosure, will appreciate, the actual swelling can depend on, for example, downhole pressure and downhole temperature, among other factors. Under downhole conditions, the swelling may be more, or less, depending on the conditions presented. For example, the swelling can be at least 200% at downhole conditions. In some embodiments, the swelling may be up to about 600% under downhole conditions.

Preferably, the elastomer is not degradable under downhole conditions.

Some specific examples of oil-swellable elastomers include, but are not limited to the group consisting of:
natural rubber,
acrylate butadiene rubber,
polyacrylate rubber,
isoprene rubber,
choloroprene rubber,
butyl rubber,
brominated butyl rubber,
chlorinated butyl rubber,
chlorinated polyethylene,
neoprene rubber,
sulphonated polyethylene rubber,
epichlorohydrin-ethylene oxide copolymer rubber
ethylene acrylate rubber,
ethylene-propylene rubber,
acrylonitrile-butadiene rubber (NBR),
styrene-butadiene rubber,
styrene-butadiene block copolymer rubber,
styrene-butadiene rubber,
acrylonitrile-styrene-butadiene rubber,
ethylene-propylene-diene terpolymer rubber,
ethylene-vinyl acetate copolymer rubber,
fluorosilicone rubber,
silicone rubber,
poly 2,2,1-bicyclo heptene (polynorborneane) rubber,
alkylstyrene rubber,
crosslinked vinyl-acrylate copolymer rubber,
crosslinked substituted vinyl-acrylate copolymer rubber,
and any combination thereof.

Preferably, the oil-swellable elastomer is selected from the group consisting of:
acrylonitrile-butadiene rubber (NBR),
styrene-butadiene rubber,
styrene-butadiene block copolymer rubber,
styrene-butadiene rubber,
acrylonitrile-styrene-butadiene rubber,
ethylene-propylene-diene terpolymer rubber,
and any combination thereof.

More preferably, the oil-swellable elastomer is selected from the group consisting of: ethylene propylene diene terpolymer or styrene butadiene copolymer.

Other swellable elastomers that behave in a similar fashion with respect to oil also may be suitable. Those of ordinary skill in the art, with the benefit of this disclosure, will be able to select an appropriate oil-swellable elastomer based on a variety of factors, including the application in which the elastomer will be used and the desired oil-swellable characteristics.

NBR (also known as nitrile rubber, Buna-N, or Perbunan), is a copolymer of butadiene and acrylonitrile. NBR is the workhorse of the oil and gas recovery industry.

HNBR is a highly saturated NBR. HNBR has better thermal and chemical stability than standard NBR because the double bonds have been removed through hydrogenation. HNBR cured with sulfur offers excellent extrusion resistance. HNBR can be cured with peroxide to get better chemical and thermal stability.

FKM is a fluorocarbon terpolymer of vinylidene fluoride and hexafluoropropylene. These elastomeric materials have good inorganic acid resistance, but poor base resistance. If compounded properly, these materials can have exceptional high-temperature properties. They are susceptible, however, to degradation by organic amine corrosion inhibitors.

TFE/P is a copolymer of tetrafluoroethylene and propylene. TFE/P has good acid and base resistance, but will swell in oil-based muds (OBM) and aromatic solvents. Demanding oilfield applications require the use of the 100H and 100S grade materials that offer excellent high-temperature strength.

ETP is a terpolymer of ethylene, tetrafluoroethylene, and perfluoromethylvinyl ether. ETP offers better base resistance than the FKM compounds, but it is not a base resistant material. The ETP has had limited oilfield use.

In general, diene-based polymers are presently the most preferred as oil-swellable polymers suitable for use according to the invention. Of the many possibilities, three are most commonly-used as oil-swellable elastomers, namely ethylene propylene diene terpolymer, styrene butadiene copolymer, acrylonitrile butadiene styrene.

The oil-swellable elastomer used in the testing was a commonly-used oil-swellable elastomer used in Halliburton's PETROGUARD™ swell packer. FTIR for the elasomer did not observe C≡N bond, which ruled out acrylonitrile butadiene styrene (ABS). Based on the FTIR analysis, the oil-swellable elastomer is most likely of ethylene propylene diene terpolymer or styrene butadiene copolymer. Accordingly, these are presently the most preferred embodiments according to the invention.

Emulsion

An emulsion is a fluid including a dispersion of immiscible liquid particles in an external liquid phase. In addition, the proportion of the external and internal phases is above the solubility of either in the other.

An emulsion can be an oil-in-water (o/w) type or water-in-oil (w/o) type. A water-in-oil emulsion is sometimes referred to as an invert emulsion. In the context of an emulsion, a "water phase" refers to a phase of water or an aqueous solution and an "oil phase" refers to a phase of any non-polar organic liquid that is immiscible with water, such as petroleum, kerosene, or synthetic oil.

It should be understood that multiple emulsions are possible. These are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

A stable emulsion is an emulsion that will not cream, flocculate, or coalesce under certain conditions, including time and temperature. As used herein, the term "cream" means at least some of the droplets of a dispersed phase converge towards the surface or bottom of the emulsion (depending on the relative densities of the liquids making up the continuous and dispersed phases). The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion.

Preferably, an emulsion should be stable under one or more of certain conditions commonly encountered in the storage and use of such an emulsion composition for a well treatment operation. It should be understood that the dispersion is visually examined for creaming, flocculating, or coalescing.

External Oil Phase for Swelling of Oil-Swellable Elastomers

An oil can be used for swelling an oil-swellable elastomer. Examples of suitable oils can be selected from the group consisting of: kerosene, diesel, fuel oils, paraffin oils, mineral oils, low toxicity mineral oils, other petroleum distillates, crude oils, or any combination thereof.

Kerosene is a thin, clear liquid formed from hydrocarbons, with a density of 0.78-0.81 $g/cm^3$, is obtained from the fractional distillation of petroleum between 150° C. (300° F.) and 275° C. (527° F.) at atmospheric pressure, resulting in a mixture of carbon chains that typically contain 6 to 16 carbon atoms per molecule. Major constituents of kerosene include n-dodecane, alkyl benzenes and derivatives, and naphthalene and derivatives.

Diesel fuel in general is any liquid fuel used in diesel engines. The most common is a specific fractional distillate of petroleum fuel oil, but alternatives that are not derived from petroleum, such as biodiesel, biomass to liquid (BTL) or gas to liquid (GTL) diesel, are increasingly being developed and adopted. To distinguish these types, petroleum-derived diesel is increasingly called petrodiesel. Petroleum diesel, also called petrodiesel or fossil diesel, is produced from the fractional distillation of crude oil between 200° C. (392° F.) and 350° C. (662° F.) at atmospheric pressure, resulting in a mixture of carbon chains that typically contain between 8 and 21 carbon atoms per molecule.

Emulsifier

An emulsifier is a kind of surfactant. Surfactants are surface active compounds, that is, they show higher activity (i.e. concentration) at the surface or interface than the bulk solution phase. Due to this property, they lower the surface tension of a liquid, the interfacial tension between two liquids, or that between a liquid and a solid. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both an oil soluble component and a water soluble component.

In a water phase, for example, surfactants form aggregates, such as micelles, where the hydrophobic tails form the core of the aggregate and the hydrophilic heads are in contact with the surrounding liquid. Other types of aggregates such as spherical or cylindrical micelles or bilayers can be formed. The shape of the aggregates depends on the chemical structure of the surfactants, depending on the balance of the sizes of the hydrophobic tail and hydrophilic head.

As used herein, the term micelle includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to solubilize certain materials.

As used herein, an "emulsifier" refers to a type of surfactant that helps prevent the droplets of the dispersed phase of an emulsion from flocculating or coalescing in the emulsion. As used herein, an emulsifier refers to a chemical or mixture of chemicals that helps prevent the droplets of the dispersed phase of an emulsion from flocculating or coalescing in the emulsion.

An emulsifier can be or include a cationic, a zwitterionic, or a nonionic emulsifier. A surfactant package can include one or more different chemical surfactants.

The hydrophilic-lipophilic balance ("HLB") of a surfactant is a measure of the degree to which it is hydrophilic or lipophilic, determined by calculating values for the different regions of the molecule, as described by Griffin in 1949 and 1954. Other methods have been suggested, notably in 1957 by Davies.)

In general, Griffin's method for non-ionic surfactants as described in 1954 works as follows:

$$HLB = 20 * Mh/M$$

where Mh is the molecular mass of the hydrophilic portion of the molecule, and M is the molecular mass of the whole molecule, giving a result on a scale of 0 to 20. An HLB value of 0 corresponds to a completely lipidphilic/hydrophobic molecule, and a value of 20 corresponds to a completely hydrophilic/lypidphobic molecule. Griffin W C: "Classification of Surface-Active Agents by 'HLB,'" Journal of the Society of Cosmetic Chemists 1 (1949): 311. Griffin W C: "Calculation of HLB Values of Non-Ionic Surfactants," Journal of the Society of Cosmetic Chemists 5 (1954): 249.

The HLB (Griffin) value can be used to predict the surfactant properties of a molecule, where a value less than 10 indicates that the surfactant molecule is lipid soluble (and water insoluble), whereas a value greater than 10 indicates that the surfactant molecule is water soluble (and lipid insoluble).

In 1957, Davies suggested an extended HLB method based on calculating a value based on the chemical groups of the molecule. The advantage of this method is that it takes into account the effect of stronger and weaker hydrophilic groups. The method works as follows:

$$HLB = 7 + m*Hh - n*Hl$$

where m is the number of hydrophilic groups in the molecule, Hh is the respective group HLB value of the hydrophilic groups, n is the number of lipophilic groups in the molecule, and Hl is the respective HLB value of the lipophilic groups. The specific values for the hydrophilic and hydrophobic groups are published. See, e.g., Davies J T: "A quantitative kinetic theory of emulsion type, I. Physical chemistry of the emulsifying agent," Gas/Liquid and Liquid/Liquid Interface. Proceedings of the International Congress of Surface Activity (1957): 426-438.

The HLB (Davies) model can be used for applications including emulsification, detergency, solubilization, and other applications. Typically a HLB (Davies) value will indicate the surfactant properties, where a value of 1 to 3 indicates anti-foaming of aqueous systems, a value of 3 to 7 indicates W/O emulsification, a value of 7 to 9 indicates wetting, a value of 8 to 28 indicates O/W emulsification, a value of 11 to 18 indicates solubilization, and a value of 12 to 15 indicates detergency and cleaning.

In an embodiment, the emulsifier is an water-in-oil emulsifier according to the HBL (Davies) scale, that is, having an HLB (Davies) in the range of about 3 to about 7.

Preferably, the emulsifier is added to oil phase. In addition, the emulsifier is preferably selected for being specific for stabilizing an acid internal phase.

Primary, secondary, tertiary, and quaternary amines and derivatives can be used as surfactants for forming emulsions.

It should be understood that a free amine added to an acidic solution can form a ammonium ion.

According to a preferred embodiment of the invention, the emulsifier has a functional group that is a source of ammonium ion, which can be referred to as a cationic amine. Such an emulsifier can be cyclic, heterocyclic, aromatic, or aliphatic in nature. Preferably, the cationic amine is a fatty cationic amine having more than 12 carbon atoms. In the case of cationic amines, an acidic pH below 4 can be used as an activator for the emulsifier such that the emulsifier has an ammonium ion.

According to a preferred embodiment, the emulsifier comprises tallow alkyl amine acetates, C16-C18 (known as CAS 61790-60). For example, the emulsifier can be about 50% tallow alkyl amines provided in a suitable solvent such as heavy aromatic naphtha and ethylene glycol.

In an embodiment, the emulsifier is preferably in a concentration of at least 1% by weight of the emulsion. More preferably, the emulsifier is in a concentration in the range of 1% to 10% by weight of the emulsion.

Aqueous Internal Phase for Breaking a Filtercake

Water Phase

Preferably, the water for use in the treatment fluid does not contain anything that would adversely interact with the other components used in the fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a fluid into a well, unused fluid, and produced water. As used herein, brine refers to water having at least 40,000 mg/L total dissolved solids.

In some embodiments, the aqueous phase of the treatment fluid may comprise a brine. The brine chosen should be compatible with the formation and should have a sufficient density to provide the appropriate degree of well control.

Salts may optionally be included in the treatment fluids for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid.

Suitable water-soluble salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, for example, the temperature at which the salt precipitates from the brine as the temperature drops. Unfortunately, dissolved salts can also exacerbate corrosion of certain metals.

Mineral Acids and Organic Acids

Mineral acids tend to dissociate in water more easily than organic acids, to produce $H^+$ ions and decrease the pH of the aqueous solution. Organic acids tend to dissociate more slowly than mineral acids and less completely.

Relative acid strengths for Bronsted-Lowry acids are expressed by the dissociation constant (pKa). A given acid will give up its proton to the base of an acid with a higher pKa value. The bases of a given acid will deprotonate an acid with a lower pKa value. In case there is more than one acid functionality for a chemical, "pKa(1)" makes it clear that the dissociation constant relates to the first dissociation.

The pKa of acids plays important role in above activities as shown in Table 1.

TABLE 1

|  | Acid | Base | pKa(1) |
|---|---|---|---|
| Strong Acids In Water | $HClO_4$ | $ClO_4^-$ | −10 |
|  | HI | $I^-$ | −10 |
|  | $H_2SO_4$ | $HSO_4^-$ | −10 |
|  | HBr | $Br^-$ | −9 |
|  | HCl | $Cl^-$ | −7 |
|  | $HNO_3$ | $NO_3^-$ | −2 |
|  | $H_3O^+$ | $H_2O$ | −1.74 |
| Weak Acids In Water | $CCl_3CO_2H$ | $CCl_3CO_2^-$ | 0.52 |
|  | $HSO_4^-$ | $SO_4^{-2}$ | 1.99 |
|  | $H_3PO_4$ | $H_2PO_4^-$ | 2.12 |
|  | $CH_2ClCO_2H$ | $CH_2ClCO_2^-$ | 2.85 |
|  | HF | $F^-$ | 3.17 |
|  | $HNO_2$ | $NO_2^-$ | 3.3 |
|  | $CH_3CO_2H$ | $CH_3CO_2^-$ | 4.75 |
|  | $C_5H_5NH^+$ | $C_5H_5N$ | 5.25 |
|  | $H_2CO_3$ | $HCO_3^-$ | 6.35 |
|  | $H_2S$ | $HS^-$ | 7.0 |
|  | $NH_4^+$ | $NH_3$ | 9.24 |
|  | $HCO_3^-$ | $CO_3^{-2}$ | 10.33 |
|  | $CH_3NH_3^+$ | $CH_3NH_2$ | 10.56 |
|  | $H_2O$ | $OH^-$ | 15.74 |

Water ($H_2O$) is the base of the hydronium ion, $H_3O^+$, which has a pKa −1.74. An acid having a pKa less than that of hydronium ion, pKa −1.74, is considered a strong acid.

For example, hydrochloric acid (HCl) has a pKa −7, which is greater than the pKa of the hydronium ion, pKa −1.74. This means that HCl will give up its protons to water essentially completely to form the $H_3O^+$ cation. For this reason, HCl is classified as a strong acid in water. One can assume that all of the HCl in a water solution is 100% dissociated, meaning that both the hydronium ion concentration and the chloride ion concentration correspond directly to the amount of added HCl.

Acetic acid ($CH_3CO_2H$) has a pKa of 4.75, greater than that of the hydronium ion, but less than that of water itself, 15.74. This means that acetic acid can dissociate in water, but only to a small extent. Thus, acetic acid is classified as a weak acid.

In an embodiment, the pH of the aqueous phase of a treatment fluid is initially less than about 4. Most preferably, the pH at the time of forming the treatment fluid is in the range of about 2 to about 4.

Delayed-Release Acid

In an embodiment, the fluid includes a delayed release acid. An example of a delayed-release acid is an acid precursor such as a carboxylate ester.

Carboxylate ester systems are designed to be effective in attacking the filtercake but to avoid the drawbacks associated with live acid. The basic concept behind the carboxylate ester approach is to treat the filtercake with a solution that is essentially pH neutral and can be placed over the entire productive interval without significant interaction with the filtercake. So there is minimal risk of localized removal of the filtercake.

A solution of an carboxylate ester as an acid precursor will react slowly with the water in the carrier water or brine to release an organic acid, which preferably has a pKa(1) of at least 3.75. More preferably, the pKa(1) is in the range of 3.75 to 5.

Optionally, a supplementary additive such as starch enzyme or oxidizing agent to attack the polymers in the filtercake can be included. There are helpful if the design temperature is less than about 70° C. (about 160° F.); above this temperature the released acid is capable of destroying the polymer.

Optionally, a surfactant can be included, if required or helpful.

The release of the organic acid from the acid precursor is slow. For example, depending upon temperature, about two days can be required for all the acid to be released. For this reason, it is preferred that when the treatment fluid has been placed in the zone, an isolation device (for example, a flapper or ball valve) be closed to isolate the treated section from the hydrostatic pressure. Otherwise, as the filtercake and near well bore damage may be degraded sufficiently to allow fluid losses, which would probably occur in a non-uniform manner along the open hole, then the remainder of the unreacted treatment fluid can be lost to the formation and the filtercake may not be attacked as fully as possible. Isolation is not required in all formations, however.

Acid precursors of this type are obviously not as powerful as a strong acid such as hydrochloric acid, but they do have several advantages. For example, the entire interval can be exposed to the acid because the fluid placed into the openhole section is essentially neutral and as the acid is liberated subsequently. There is less corrosion potential because the pH of the treatment fluid is self-buffered at pH about 4. There are very few health, safety, and environmental ("HSE") concerns associated with the acid precursors. In addition, there is no need for special storage tanks or handling equipment because neutral pH fluids are being handled.

The most commonly used acid precursor is a carboxylate ester, although other acid precursors are contemplated. The reaction with water can be represented as follows regarding an example with a formate ester:

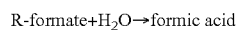

A comparison of the reaction rate of carboxylate ester and acetic acid with finely ground calcium carbonate showed that the reaction with acetic acid is extremely rapid, whereas the reaction for carboxylate ester continues over an extended period.

If the design temperature is above about 70° C., the released acid can hydrolyse starch.

When the released formic acid reacts with calcium carbonate, the system becomes self-buffered at around pH 4. Other carboxylate esters can produce organic acids that buffer at a somewhat higher pH.

A carboxylate ester releases acid on hydrolysis. A carboxylic ester can react with water and upon hydrolysis it releases an organic acid. Depending on type of ester selected, such as a formate, acetate, or lactate, the respective acid is released such as formic acid, acetic acid or lactic acid. The concentration of the carboxylate ester in a treatment fluid preferably ranges from about 5% v/v to about 20% v/v.

The solvents for such a carboxylate ester can be water, brine (NaCl, NaBr, $CaCl_2$, etc.).

Preferred examples of hydrolyzable esters of carboxylic acid can be selected from the group consisting of: lactic acid derivatives; esters or formates that are water soluble or partially water soluble; esters or polyesters of glycerol; esters of acetic acid and glycerol; aliphatic polyesters; poly(lactides); poly(glycolides); poly($\epsilon$-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphonic acid, phosphinic acid, sulphamic acid, and any combination thereof.

The presently most preferred hydrolyzable ester of a carboxylic acid includes or can consist essentially of diethylene glycol diformate.

Corrosion Inhibition

In general, "corrosion" is the loss of metal due to chemical or electrochemical reactions, which could eventually destroy a structure. The corrosion rate will vary with time depending on the particular conditions to which a metal is exposed, such as the amount of water, pH, other chemicals, temperature, and pressure. Examples of common types of corrosion include, but are not limited to, the rusting of metal, the dissolution of a metal in an acidic solution, oxidation of a metal, chemical attack of a metal, electrochemical attack of a metal, and patina development on the surface of a metal.

Corrosion of metals can occur anywhere in an oil or gas production system, such as in the downhole tubulars, equipment, and tools of a well, in surface lines and equipment, or transportation pipelines and equipment. Carbon steel commonly used in wells includes, without limitation, J55 steel, N-80 steel, and P-110 steel. In contrast, aluminum is less commonly used in wells.

The expense of repairing or replacing corrosion damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. In addition, the partial neutralization of the acid from undesired corrosion reactions can result in the production of quantities of metal ions that are highly undesirable in the subterranean formation.

Acidic fluids are present in a multitude of operations in the oil and gas industry. For example, acidic fluids are often used in wells penetrating subterranean formations. Such acidic fluids may be used, for example, in stimulation operations or clean-up operations in oil and gas wells. In operations using acidic fluids, metal surfaces of piping, tubing, pumps, blending equipment, downhole tools, etc. may be exposed to the acidic fluid.

As mineral acids are stronger acids than organic acids, mineral acids tend to be more corrosive than organic acids. In addition, at elevated temperatures the dissociation rate increases significantly, and hence, all else being equal, an acid becomes more corrosive.

Even weakly acidic fluids can be problematic in that they can cause corrosion of metals. As used herein with reference to the problem of corrosion, "acid" or "acidity" refers to a Bronsted-Lowry acid or acidity.

The mechanism of corrosion for both cases (mineral acids and organic acids) is expected to be same, the only difference is in the rate of corrosion. The rate of corrosion will depend upon the availability of $H^+$ ion released from acid. Mineral acids dissociate completely to give more $H^+$ ions as compared to organic acids.

To combat this potential corrosion problem in operations with acidic fluids, corrosion inhibitors have been used to reduce corrosion to metals and metal alloys with varying degrees of success.

As used herein, the term "inhibit" or "inhibitor" refers to slowing down or lessening the tendency of a phenomenon (e.g., corrosion) to occur or the degree to which that phenomenon occurs. The term "inhibit" or "inhibitor" does not imply any particular mechanism, or degree of inhibition.

Accordingly, the term "corrosion inhibitor" means a material that has the property of reducing, slowing down, or lessening the tendency to corrosion.

A "corrosion inhibitor package" can include one or more different chemical corrosion inhibitors, sometimes delivered to the well site in one or more solvents to improve flowability or handlability of the corrosion inhibitor before forming a fluid.

A treatment fluid according to the invention can include a corrosion inhibitor or package. When included in a fluid, a corrosion inhibitor is preferably in a concentration of at least 0.1% by weight of the aqueous phase. More preferably, the corrosion inhibitor is in a concentration in the range of 0.1% to 15% by weight of the aqueous phase.

A corrosion inhibitor intensifier enhances the effectiveness of a corrosion inhibitor over the effectiveness of the corrosion inhibitor without the corrosion inhibitor intensifier. According to a preferred embodiment of the invention, the corrosion inhibitor intensifier is selected from the group consisting of: formic acid and potassium iodide.

The fluid can additionally comprise a corrosion inhibitor intensifier. Corrosion inhibitor intensifiers can be selected, for example, from the group consisting of potassium iodide, cuprous chloride, antimony-based compounds, bismuth-based compounds, and any combination thereof.

The corrosion inhibitor intensifier is preferably in a concentration of at least 0.1% by weight of the aqueous phase. More preferably, the corrosion inhibitor intensifier is in a concentration in the range of 0.1% to 20% by weight of the aqueous phase. More preferably, the corrosion inhibitor intensifier is combined with the aqueous phase in an effective amount to provide at least measurable corrosion inhibition improvement for the metal to be contacted by the fluid in the well under the design conditions of contacting.

Other Fluid Additives

A treatment fluid can contain additives that are commonly used in oil field applications, as known to those skilled in the art. These include, but are not necessarily limited to, surfactants, oxygen scavengers, alcohols, sulfide scavengers, bactericides, and combinations thereof. Of course, additives should be selected for not interfering with the purpose of the treatment fluid.

Method of Treating a Well with the Treatment Fluid

According to an embodiment of the invention, a method of treating a well is provided, the method including the steps of: forming a treatment fluid in the form of an emulsion according to the invention; and introducing the treatment fluid into the well.

A treatment fluid can be prepared at the job site, prepared at a plant or facility prior to use, or certain components of the treatment fluid can be pre-mixed prior to use and then transported to the job site. No special mixing equipment is required. The rheology is not expected to be affected with normal mixing equipment. No vibration or lubricity concerns or considerations relating to the fluid or equipment being used with the fluid. Being an invert emulsion, the fluid is not expected to have any lubricity issues.

In certain embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

A premature hydrolysis of the ester should be avoided. For this, care should be taken that the temperature of the treatment fluid is such that it does not cause or accelerate the hydrolysis of the ester prior to reaching a portion of a wellbore to be treated.

The viscosity of the fluid should not be too high so that the fluid is pumpable.

Often the step of delivering a treatment fluid into a well is within a relatively short period after forming the treatment fluid, for example, less within 30 minutes to one hour. More preferably, the step of delivering the treatment fluid is immediately after the step of forming the treatment fluid, which is "on the fly."

It should be understood that the step of delivering a treatment fluid into a well can advantageously include the use of one or more fluid pumps.

Preferably, the step of introducing is at a rate and pressure below the fracture pressure of the treatment zone.

Preferably, the methods further comprise the step of: forming a filtercake on the borehole in the portion of the wellbore. The filtercake includes the acid-soluble or acid-degradable material of the filtercake comprises a solid particulate. For example, the solid particulate can comprise calcium carbonate.

Preferably, the methods further comprise the step of: depositing or placing the oil-swellable elastomer in the portion of the well. For example, the elastomer can be in the form of a particulate in the well. In another embodiment, the oil-swellable elastomer is part of a downhole tool. For example, the oil-swellable elastomer can be formed and positioned as a sheath over a portion of a tubular of a downhole tool. Preferably, the oil-swellable elastomer swells to seal an annulus between the tubular and a borehole of the well. In a preferred embodiment, a bonded mesh filtration media is included with the portion of the tubular. For example, the bonded mesh filtration media can be of a sand control device. In such a case, preferably a subterranean formation adjacent the portion of the tubular produces sand, whereby the method provides sand control.

After the step of introducing, the method preferably includes a step of allowing the treatment fluid to contact the filtercake and the elastomer for a sufficient contact time under the design temperature and other conditions to break the filtercake and swell the elastomer.

In the case of a downhole tool with such an elastomer, preferably the step of contacting is with at least a sufficient amount of the treatment fluid to fill an annulus between the portion of the tubular of the downhole tool and a borehole of the well.

Preferably, the step of contacting is with at least a sufficient amount of the treatment fluid to swell the oil-swellable elastomer at least 300% by weight. More preferably, the step of contacting is with at least a sufficient amount of the treatment fluid to swell the oil-swellable elastomer at least 400% by weight. Most preferably, the step of contacting is with at least a sufficient amount of the treatment fluid to swell the oil-swellable elastomer at least 500% by weight.

Preferably, the step of contacting further comprises: a design temperature anywhere in the range of 100° F. to 400° F. More preferably, the step of contacting further comprises: a design temperature anywhere in the range of 150° F. to 300° F.

Preferably, the step of contacting further comprises: contacting for at least 72 hours. More preferably, the step of contacting further comprises: contacting for at least 96 hours. Most preferably, the step of contacting further comprises: contacting for at least 120 hours.

Preferably, the step of contacting further comprises: contacting for less than 50 days. More preferably, the step of contacting further comprises: contacting for less than 21 days.

The cleanup from the well, return (flow back), and disposal procedure for this fluid can be expected to be the same as for a typical invert emulsion drilling fluid. As acid is in the treatment fluid or generated during the treatment, any residual acid may need to be neutralized before disposal of used treatment fluid returned to the surface.

Any of the methods can further comprise, after the step of contacting, flowing a different fluid from the well, such as a produced fluid.

Any of the methods can further comprise, after the step of contacting, injecting a different treatment fluid into the well.

Preferably, after any such method according to the invention, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

Filtercake Formation

An example of a filtercake was prepared from an organophilic clay-based invert emulsion. The clay-based invert emulsion had a composition as shown in Table 1A with a density of 10.01 ppg. This clay-based invert emulsion was formulated and hot-rolled at 176° F. (80° C.) for 16 hours. The hot rolling simulates conditions that such a fluid experiences while drilling a well. The rheology of the hot-rolled emulsion was measured at 120° F. (49° C.) as reported in Table 1B.

TABLE 1A

Composition of Filtercake-Forming Clay-Based Invert Emulsion

| Component | Units | Mixing time (min) | Concentration |
| --- | --- | --- | --- |
| Base Oil | bbl/bbl | — | 0.575 |
| Emulsifier (polyaminated fatty acid) | lb/bbl | 2 | 10 |
| Lime (as emulsifier activator) | lb/bbl | 2 | 2 |
| Organophilic Leonardite (as filtration control agent) | lb/bbl | 5 | 10 |
| Viscosifier | lb/bbl | 5 | 4 |

TABLE 1A-continued

Composition of Filtercake-Forming Clay-Based Invert Emulsion

| Component | Units | Mixing time (min) | Concentration |
|---|---|---|---|
| (organophilic clay) | | | |
| Suspension Agent | lb/bbl | 5 | 4.5 |
| (organophilic clay) | | | |
| Water | bbl/bbl | 5 | 0.179 |
| Calcium Chloride | lb/bbl | | 32.311 |
| Viscosifier | lb/bbl | 5 | 0.75 |
| (dimer and trimer fatty acids) | | | |
| Lecithin | lb/bbl | 2 | 0.75 |
| Calcium Carbonate (25 micron) | lb/bbl | 2 | 96 |
| Calcium Carbonate (5 micron) | lb/bbl | 2 | 48 |

TABLE 1B

Rheology at 120° F. (49° C.) of Filtercake-Forming Clay-Based Invert Emulsion

| FANN ™ Model 35 RPM | Dial reading |
|---|---|
| 600 | 41 |
| 300 | 24 |
| 200 | 18 |
| 100 | 12 |
| 6 | 4 |
| 3 | 4 |
| Gel strength at 10 seconds | 5 |
| Gel strength at 10 minutes | 8 |
| Plastic Viscosity cp | 17 |
| Yield Point (lb/100 ft$^2$) | 7 |
| Low Shear Yield Point (lb/100 ft$^2$) | 4 |

A filtercake was then prepared on a 50 μm ceramic disk at 176° F. (80° C.) using a 500 ml HPHT cell according to the method API 13B-2 of the American Petroleum Institute ("API").

Example Treatment Fluids for Breaking Swelling Elastomer and Removal

A treatment fluid according to the invention includes a water-in-oil emulsion wherein the internal phase of the emulsion comprises of a hydrolyzable ester of carboxylic acid and water. The carboxylic acid ester used in this example of such a treatment fluid was diethylene glycol diformate. To obtain a treatment fluid having a density of 10.01 ppg, NaBr salt solution of appropriate density was used in the internal phase. Thus, the internal aqueous phase comprised diethylene glycol diformate and NaBr solution.

The external phase of the example treatment fluid comprised of a base oil and an emulsifier, wherein the emulsifier was been chosen to give a stable water-in-oil emulsion that does not break during the hydrolysis of the carboxylic ester. The base oil in the example treatment fluid was "EDC 99 DW" commercially available from Total Special Fluids. The emulsifier in the example treatment fluids was a mixture of acetate salts of fatty amines, that is, monotallowamine and ditallowamine having alkyl chain lengths in the range of 16-20 and 32-40, respectively.

Treatment fluids containing 12.5% v/v, 15% v/v, and 17% v/v diethylene glycol diformate were formulated for study. The concentration of the additives to formulate the treatment fluids is given in Table 2.

TABLE 2

Example Treatment Fluids with Diethylene Glycol Diformate

| Component | Unit | Fluid #1 | Fluid #2 | Fluid #3 |
|---|---|---|---|---|
| Oil-Water Ratio | — | 37/63 | 37/63 | 37/63 |
| Base Oil | bbl/bbl | 0.362 | 0.36 | 0.36 |
| Emulsifier | lb/bbl | 4 | 4 | 4 |
| NaBr | lb/bbl | 118.2 | 117.5 | 113.0 |
| Water | lb/bbl | 143.6 | 134.7 | 129.5 |
| diethylene glycol diformate | % v/v | 12.4% (52 ppb) | 15% (63 ppb) | 17.1% (72 ppb) |

Oven and Breaker Tests with Example Treatment Fluids

To evaluate the performance of the example treatment fluids 1-3 described above, oven and breaker tests were performed at 176° F. (80° C.) on filtercakes obtained on 50 μm filter disks using the filtercake-forming clay-based invert emulsion (described above).

The oven tests involved building a filtercake in a HPHT test cell and then pouring off the mud. The test cell was then filled with one of the example treatment fluids 1-3, pressurized, the bottom stem of the cell is left closed, and finally the cell was placed in an oven at a specified temperature for a specified number of hours, cooled to ambient temperature, pressure released, treatment fluid is poured off, and the condition of the filtercake was visually observed.

A 24 hour oven test at 176° F. (80° C.) performed with 12.4% v/v diethylene glycol diformate treatment fluid did not result in any breaking or disruption of the filtercake. Hence extended oven tests were performed wherein tests for a time period of 48 and 72 hours. The oven test after 48 hours resulted in substantial disruption of the filtercake. After 72 hours, complete disruption of the filtercake was obtained.

However, unlike the 12.4% v/v diethylene glycol diformate treatment fluid, oven tests with 15% v/v and 17% v/v diethylene glycol diformate treatment fluids resulted in substantial breaking of the filtercake after only 24 hours.

The emulsion of the treatment fluid was also found to be stable, that is, with no oil-water separation at the end of the oven tests.

The breaker tests use a HPHT test cell The breaker tests involved building a filtercake in the HPHT test cell using a clay-based invert emulsion fluid at desired temperature and 500 psi differential pressure as per API procedure and then pouring off the mud. The cell was then filled with an example treatment fluid, pressurized, and kept in a heating jacket at desired temperature, the bottom stem left open in order to record the time delay until fluid breakthrough occurs.

The results of the breaker tests with the example treatment fluids 1-3 are given in Table 3. Breaker tests performed with the 12.4% v/v diethylene glycol diformate treatment fluid did not result in any fluid flow breakthrough even after 10 hours. This showed that the filtercake on the disk was not disrupted even after 10 hours of contact of the filtercake with the 12.4% v/v diethylene glycol diformate treatment fluid during the test at 176° F. (80° C.). However, with the 15% v/v and 17% v/v diethylene glycol diformate treatment fluids, the fluid flow breakthrough began after just 3 hours. This shows that increasing the diethylene glycol diformate concentration in the internal aqueous phase of the treatment fluid results in shortening of the filtercake breaking time.

TABLE 3

Filtercake Breaker Tests with Example Treatment Fluids

| 12.4% v/v diethylene glycol diformate | | 15% v/v diethylene glycol diformate | | 17% v/v diethylene glycol diformate | |
|---|---|---|---|---|---|
| Time | ml. | Time | ml. | Time | ml. |
| 30 min | 1 | 30 min | 1 | 30 min | 0 |
| 1.0 hour | 1 | 1.0 hour | 1 | 1 hour | 5 |
| 1.30 hour | 2 | 1.30 hour | 2 | 2.0 hour | 8 |
| 3.0 hour | 4 | 2.15 hour | 2 | 2.30 hour | 11 |
| 6.0 hour | 7 | 2.30 hour | 3 | 3.0 hour | 31 |
| 10.0 hour | 8.2 | 3.00 hour | 78 | 3.15 hour | 135 |
| | | 3.15 hour | 234 | 3.30 hour | 162 |
| | | | | 4.0 hour | 185 |
| | | | | 4.15 hour | 198 |

A summary of the oven and breaker tests at 176° F. (80° C.) is given in Table 4.

TABLE 4

Summary of Oven and Breaker Tests

| Diethylene Glycol Diformate Emulsion | Oven Test | Breaker Test |
|---|---|---|
| 12.5% v/v | Disrupted after 2 days | Did not break after 10 hours, test discontinued |
| 15% v/v | Disrupted after 1 day | 3 hours |
| 17% v/v | Disrupted after 1 day | 3 hours |

The oven and breaker tests thus show that the 12.4% v/v diethylene glycol diformate treatment fluid results in complete disruption of the filtercake after 2 days and gives a delay of at least 10 hours in the breaking of the filtercake.

At the same time, increase in concentration of the diethylene glycol diformate from 12.4% v/v to 15% v/v and 17% v/v results in substantial disruption of the filtercake after 24 hours but gives a delay of only 3 hours in breaking of the filtercake.

Swelling of Elastomers with Example Treatment Fluids

The elastomer used in these examples was NBR sulfur cured and has a 40% acrylonitrile content, which gives the material good strength and oil resistance and is thermally stable for long-term use to 275° F. (135° C.).

Samples of the oil-swellable elastomer were subjected to swelling in the 12.4% v/v diethylene glycol diformate treatment fluid compared to in the base oil alone. The elastomers were placed in the same volume of the respective fluids kept in glass liners for a period of 7 days at 176° F. (80° C.) and 100 psi. The change in weight and volume of the elastomer samples was measured. After 7 days, the extent of swelling of the elastomer in the treatment fluid was observed to be less than in pure base oil. This is consistent with the amount of the oil being less in the sample treatment fluid than in the pure base oil.

The emulsion of the new treatment fluid was found to be stable with no oil-water separation at the end of 7 days of the swelling test at 176° F. (80° C.). The elastomer-swelling results at 176° F. (80° C.) are given in Table 5.

TABLE 5

Swelling tests of elastomer in emulsion

| Test Parameter | Elastomer Sample in 12.4% v/v Diethylene Glycol Diformate Treatment Fluid | Elastomer in Base Oil (EDC 99 DW) |
|---|---|---|
| Initial weight, g | 8.4034 | 8.3552 |
| Final weight, g | 22.1885 | 30.1632 |
| Change in weight, g (%) | 13.7851 (164%) | 21.808 (261%) |
| Initial volume, cm$^3$ | 7.757 | 7.794 |
| Final volume, cm$^3$ | 25.63 | 33.95 |
| Change in volume cm$^3$ (%) | 17.87 (230%) | 26.156 (335.6%) |

Emulsion Stability of the Treatment Fluid after Extended Oven Test

To obtain proper swelling of the elastomer, one of the main requirements of the new treatment fluid was that it had to remain stable for an extended period of time. Hence, it was required to verify the stability of the emulsion at the end of the filtercake breaking test.

Thus, an extended oven test was performed using the 12.4% v/v diethylene glycol diformate treatment fluid for 7 days at 176° F. (80° C.), after which the treatment fluid was observed to check its emulsion stability. At the end of 7 days, the treatment fluid was able to completely disrupt the filtercake and was observed to be stable with no oil-water separation.

Emulsion Stability with Internal Phase Having pH Above 4

In order to verify that a stable emulsion is formed having or developing an internal phase with a pH greater than 4, for example, after spending of an acid, two experiments were performed. In the first experiment, an internal aqueous phase was formulated to have a pH of 5.6. This internal phase consisted of water, NaBr, and 12.5% v/v diethylene glycol diformate. In the second experiment, an internal aqueous phase was formulated having a pH of 6.6. This internal phase consisted of water, NaBr, 12.5% v/v diethylene glycol diformate, and NaHCO$_3$ (to adjust the pH to 6.6). The base oil in these experiments was "EDC 99 DW" commercially available from Total Special Fluids. The emulsifier in the example treatment fluids was a mixture of acetate salts of fatty amines, that is, monotallowamine and ditallowamine having alkyl chain lengths in the range of 16-20 and 32-40, respectively. In both of these experiments, a stable water-in-oil emulsion was formed. There was no oil separation or breaking of emulsion even after keeping the emulsion for 2 hours at room temperature.

A dilution test wherein some of the formulated emulsion was introduced into water confirmed that the emulsion was indeed a water-in-oil emulsion.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (that is, pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a portion of a wellbore of a well, the method comprising the steps of:
    (A) forming a treatment fluid in the form of an emulsion comprising:
        (i) a continuous oil phase, wherein the oil phase comprises:
            (a) an oil; and
            (b) an emulsifier; and
        (ii) an internal aqueous phase, wherein the aqueous phase comprises:
            (a) water; and
            (b) a water-soluble hydrolyzable ester of a carboxylic acid;
        wherein the emulsion is stable to hydrolysis of the water-soluble hydrolyzable ester of the carboxylic acid; and
    (B) introducing the treatment fluid into the portion of the wellbore, wherein:
        (i) a filtercake has been previously formed in the portion of the wellbore, wherein the filtercake comprises an acid-soluble or an acid-degradable material; and
        (ii) an oil-swellable elastomer has been previously deposited or positioned in the portion of the wellbore.

2. The method according to claim 1, wherein the emulsion of the treatment fluid is stable for at least 7 days at a temperature of 176° F. (80° C.).

3. The method according to claim 1, wherein the oil is selected from the group consisting of: kerosene, diesel, a fuel oil, a paraffin oil, a mineral oil, a low toxicity mineral oil, a petroleum distillate, a crude oil, or any combination thereof.

4. The method according to claim 1, wherein the emulsifier stabilizes the emulsion during a hydrolysis reaction of the ester.

5. The method according to claim 1, wherein the emulsifier has a hydrophilic-lipophilic balance (HLB) in the range of about 3 to about 7.

6. The method according to claim 1, wherein the emulsifier comprises a cationic amine.

7. The method according to claim 6, wherein the cationic amine is a fatty cationic amine having more than 12 carbon atoms.

8. The method according to claim 1, wherein the water-soluble hydrolyzable ester of the carboxylic acid is selected from the group consisting of:
    a lactic acid derivative;
    an ester or formate that is water soluble or partially water soluble;
    an ester or polyester of glycerol;
    an ester of acetic acid and glycerol;
    an aliphatic polyester;
    a poly(lactide));
    a poly(glycolide);
    a poly($\epsilon$-caprolactone);
    a poly(hydroxybutyrate);
    a poly(anhydride);
    an aliphatic polycarbonate;
    a polyphosphazene;
    a poly(ortho ester);
    an orthoester;
    an ester of oxalic acid;
    a poly(amino acid);
    an ester of propionic acid;
    an ester of butyric acid;
    a halide ester;
    an ester of nitric acid,
    sulphuric acid,
    sulphonic acid,
    sulphinic acid,
    phosphoric acid,
    phosphorous acid,
    phosphonic acid,
    phosphinic acid, and
    sulphamic acid.

9. The method according to claim 1, wherein the water-soluble hydrolyzable ester of a carboxylic acid comprises diethylene glycol diformate.

10. The method according to claim 1, wherein the internal aqueous phase additionally comprises a water-soluble salt.

11. The method according to claim 1, wherein the oil-swellable elastomer is selected from the group consisting of:
    natural rubber,
    acrylate butadiene rubber,
    polyacrylate rubber,
    isoprene rubber,
    choloroprene rubber,
    butyl rubber,
    brominated butyl rubber,
    chlorinated butyl rubber,
    chlorinated polyethylene,
    neoprene rubber, sulphonated polyethylene rubber,
epichlorohydrin-ethylene oxide copolymer rubber
ethylene acrylate rubber,
ethylene-propylene rubber,
acrylonitrile-butadiene rubber (NBR),
styrene-butadiene rubber,
styrene-butadiene block copolymer rubber,
styrene-butadiene rubber,
acrylonitrile-styrene-butadiene rubber,
ethylene-propylene-diene terpolymer rubber,
ethylene-vinyl acetate copolymer rubber,
fluorosilicone rubber,
silicone rubber,
poly 2,2,1-bicyclo heptene (polynorborneane) rubber,
alkylstyrene rubber,
crosslinked vinyl-acrylate copolymer rubber,
crosslinked substituted vinyl-acrylate copolymer rubber,
and any combination thereof.

* * * * *